United States Patent [19]

Morishita et al.

[11] 4,157,362
[45] Jun. 5, 1979

[54] PROCESS FOR CARBOXYLATION OF ETHYLENE-VINYL ACETATE COPOLYMERS

[75] Inventors: Nobuo Morishita; Mitsutaka Saito, both of Shin-nanyo, Japan

[73] Assignee: Toyo Soda Manufacturing Co., Ltd., Yamaguchi, Japan

[21] Appl. No.: 887,218

[22] Filed: Mar. 16, 1978

[30] Foreign Application Priority Data

May 16, 1977 [JP] Japan .................................. 52-55296

[51] Int. Cl.² .......................................... C08F 263/04
[52] U.S. Cl. ................................................ 260/878 R
[58] Field of Search .................................... 260/878 R

[56] References Cited

U.S. PATENT DOCUMENTS

| | | | |
|---|---|---|---|
| 2,970,150 | 1/1961 | Bailey | 260/448.2 H |
| 3,296,196 | 1/1967 | Lamoreaux | 260/448.2 B |
| 3,305,606 | 2/1967 | Hardt et al. | 260/878 R |
| 3,355,516 | 11/1967 | Hardt et al. | 260/878 R |
| 3,358,054 | 12/1967 | Hardt et al. | 260/878 R |
| 3,450,736 | 6/1969 | DeMonterey | 260/448.2 B |
| 3,737,483 | 6/1973 | Kosaka et al. | 260/878 R |
| 3,749,756 | 7/1973 | Kosaka et al. | 260/878 R |
| 3,848,025 | 11/1974 | Alberts et al. | 260/878 R |
| 3,896,067 | 7/1975 | Kosaka et al. | 260/878 R |
| 3,950,209 | 4/1976 | Kosaka et al. | 260/878 R |
| 3,953,541 | 4/1976 | Fuji | 260/878 R |

FOREIGN PATENT DOCUMENTS 2147318 2/1973 Fed. Rep. of Germany ...... 260/878 R
461931 2/1975 U.S.S.R. .......................... 260/448.2 H

OTHER PUBLICATIONS

Addition of Silicon Hydrides to Phenylalkenes, J. Amer. Chem. Soc., vol. 29; pp. 2519–2524; Musolf et al., 1964.

Primary Examiner—Alan Holler
Attorney, Agent, or Firm—Oblon, Fisher, Spivak, McClelland & Maier

[57] ABSTRACT

Ethylene-vinyl acetate copolymers are carboxylated by copolymerizing an alpha, beta-unsaturated carboxylic acid and/or anhydride thereof with at least one vinylidene monomer having the formula:

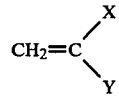

wherein X and Y can be the same or different, and each represents hydrogen, chlorine, alkyl, acetoxy, carboxylic acid ester group or cyano; with an ethylene-vinyl acetate copolymer in the presence of a polymerization initiator in a reaction medium of a ketone compound or a mixture of a ketone compound and an acetic acid ester, wherein the reaction is conducted in a heterogeneous state.

12 Claims, No Drawings

PROCESS FOR CARBOXYLATION OF ETHYLENE-VINYL ACETATE COPOLYMERS

BACKGROUND OF THE INVENTION

1. FIELD OF THE INVENTION

The present invention relates to a process for the carboxylation of ethylene-vinyl acetate copolymers. More particularly, the present invention relates to a process in which carboxylic acid residues are incorporated into an ethylene-vinyl acetate copolymer such that the resultant product maintains the physical form of the original copolymer such as the powdered or pelletized form of the copolymer.

2. DESCRIPTION OF THE PRIOR ART

Ethylene-vinyl acetate copolymers have excellent properties of adhesiveness, melt flowability, toughness and softness. It has been known to introduce carboxylate group into ethylene-vinyl acetate so as to remarkably improve property. However, the chemical modification has been performed on ethylene-vinyl acetate copolymer by a method in which the reaction in conducted in the molten state and by a method in which the polymer is dissolved in a solvent and the reaction is performed in solution. No method is known in which the reaction can be conducted conveniently while maintaining the original form of the polymer, for example, as a powdered or pelletized material.

If carboxylation of a copolymer can be accomplished by a heterogeneous reaction in which the original powdered or pelletized form of the polymer is retained, such complicated steps which are inherent in the conventional solution method, as dissolution of the polymer before the reaction, separation of the carboxylated polymer and pelletization of the separated polymer, will become unnecessary. Such a method would have industrial advantages.

SUMMARY OF THE INVENTION

Accordingly, one object of the present invention is to provide a method for the introduction of carboxylate groups into ethylene-vinyl acetate without altering the physical form of the starting copolymer material.

Another object of the present invention is to provide an ethylene-vinyl acetate copolymer of improved melt adhesion characteristics.

Briefly, these objects and other objects of the present invention as hereinafter will become more readily apparent can be attained in a method of carboxylating ethylene-vinyl acetate copolymer by copolymerizing an alpha, beta-unsaturated carboxylic acid and/or anhydride thereof with or without a vinylidene monomer having the formula:

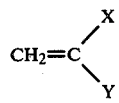

wherein X and Y can be the same or different and each represents hydrogen, chlorine, alkyl, acetoxy, carboxylic acid ester or cyano; with an ethylene-vinyl acetate copolymer in the presence of a polymerization initiator in a reaction medium of a ketone compound or a mixture of an acetic acid ester and a ketone compound wherein the reaction is conducted in a heterogeneous state.

DETAILED DESCRIPTION OF THE PREFERRED EMBODIMENTS

The carboxylated ethylene-vinyl acetate copolymer product of the present invention is prepared by copolymerizing an ethylene-vinyl acetate copolymer, an alpha, beta-unsaturated carboxylic acid and/or anhydride thereof and a vinylidene monomer having the above formula. The specific type of copolymer, acid and/or anhydride and vinylidene monomer components chosen depends upon the intended use of the resulting carboxylated polymer. In general, 99 to 50 parts by weight of an ethylene-vinyl acetate copolymer is reacted with 1 to 50 parts by weight of an alpha, beta-unsaturated carboxylic acid and/or anhydride thereof or a mixture of the carboxylic acid and/or anhydride and a vinylidene monomer. When the vinylidene monomer is used, 99 to 10 parts by weight of the carboxylic acid and/or anhydride and 1 to 90 wt. parts of the vinylidene monomer are copolymerized with ethylene-vinyl acetate copolymer.

An ethylene-vinyl acetate copolymer which is used in the present invention can be prepared by a high pressure polymerization method conducted under 1,000 to 3,000 atmospheres or by a conventional solution or emulsion polymerization method conducted under 100 to 400 atmospheres.

It is preferred that the vinyl acetate content of the ethylene-vinyl acetate copolymer be in the range of 1 to 50% by weight and that the melt index be in the range of 0.1 to 500 g/10 min.

Suitable alpha, beta-unsaturated carboxylic acids or their anhydrides which can be employed include, for example, acrylic acid, methacrylic acid, maleic acid, fumaric acid, itaconic acid, the methyl and ethyl hydrogen esters of maleic acid and fumaric acid, maleic anhydride and itaconic anhydride. Acrylic acid, fumaric acid, maleic anhydride and methacrylic acid are especially preferred. These monomers may be used singly or in combination.

Suitable vinylidene monomers which can be used in the present invention have the following formula:

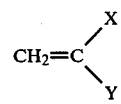

wherein X and Y can be the same or different, and each represents hydrogen, chlorine, alkyl, acetoxy, carboxylic acid ester, or cyano. Specific examples of vinylidene monomers include ethylene, propylene, isobutene, butene-1, octene-1, vinyl chloride, vinylidene chloride, vinyl acetate, methyl acrylate, ethyl acrylate, butyl acrylate, octyl acrylate, methyl methacrylate, vinyl chloroacetate and acrylonitrile. Ethylene, propylene, vinyl acetate, acrylic acid esters, methacrylic esters and vinyl chloride are preferred monomers.

Suitable radical initiators which can be used as the polymerization initiator in the present method include the polymerization initiators well known to those skilled in the art. The initiators preferably include dialkyl peroxides such as di-t-butyl peroxide; peroxy esters such as t-butyl peroctoate, t-butyl peracetate and t-butyl perpivalate, and diacyl peroxides such as benzoyl peroxide and acetyl peroxide. The radical initiator can be used in an amount of 1 to 50% by weight based on the monomer mixture.

The primary objective of the present invention is to conduct the reaction smoothly and conveniently while maintaining the polymer in its original powdered or pelletized form. In order to achieve this object sufficiently, the polymerization is preferably conducted at a temperature a little higher than the Vicat softening point of the starting ethylene-vinyl acetate copolymer as determined from the standardized procedure set forth in ASTM D-1525-65T. That is, the polymerization is conducted at a temperature in the range of room temperature to a temperature higher by up to 30° C., than the Vicat softening point of the starting polymer. In general, the reaction temperature is selected within the range of room temperature to 100° C. depending on the vinyl acetate content of the starting ethylene-vinyl acetate copolymer, and it is especially preferred that the polymerization be conducted at a temperature a little higher than the Vicat softening point of the starting ethylene-vinyl acetate copolymer.

A further important consideration in order to attain the object of the present invention is the selection of a suitable reaction medium. Suitable reaction media is a ketone compound or a mixture of an acetic acid ester and a ketone compound at a ratio of 0 to 95 parts by weight of the acetic acid ester to 100 to 5 parts by weight of the ketone.

Suitable ketone compounds include acetone, methyl ethyl ketone, methyl propyl ketone, methyl butyl ketone, diethyl ketone, ethyl propyl ketone and dipropyl ketone. It is preferable to use a ketone compound having up to 7 carbon atoms.

Suitable acetic acid esters include methyl acetate, ethyl acetate, propyl acetate and butyl acetate.

In general, the carboxylated ethylene-vinyl acetate copolymer obtained according to the process of the present invention has an acid value of 1 to 100 mg KOH/g, and its bonding properties are substantially improved over the basic ethylene-vinyl acetate copolymer.

The polymer of the present invention possesses excellent melt-adhesive or melt-bonding properties to not only such metals as iron and aluminum, but also materials having a smooth surface, such as polyolefins, vinyl chloride resins, ABS resins and cellophanes.

Moreover, because the excellent melt flowability and moldability properties inherent in the basic ethylene-vinyl acetate copolymer are retained in the polymer of the present invention, the polymer product of the present invention is very useful and valuable as a resin for extrusion coating, as a film adhesive or as an adhesive for the production of a laminated structure.

Having generally described the invention, a more complete understanding can be obtained by reference to certain specific examples, which are provided herein for purposes of illustration only and are not intended to be limiting unless otherwise specified. In the Examples, the terms "parts" and "%" are by weight.

EXAMPLE 1

The following components were charged into a 2-liter capacity glass reactor equipped with an agitator and the carboxylation reaction was conducted in the following manner:

| | |
|---|---|
| Ethylene-vinyl acetate copolymer (vinyl acetate content = 20%, melt index = 20 g/10 min, Vicat softening point = 57° C.). | 500 g |
| Fumaric acid | 12.5 g |
| Ethyl acetate | 500 g |
| Acetone | 500 g |
| Benzoyl peroxide | 1.5 g |

The ethylene-vinyl acetate copolymer and fumaric acid were charged into the reaction vessel and the atmosphere in the reactor was thoroughly replaced by nitrogen. Then, ethyl acetate, acetone and benzoyl peroxide, were charged into the reaction vessel, and the polymerization was conducted at 70° C. for 6 hours.

Under the above polymerization conditions, the charged ethylene-vinyl acetate copolymer retained its original pelletized form and such problems as fusion and agglomeration were not encountered. After completion of the reaction, the polymer pellets were recovered by filtration, immersed in and washed and dried in vacuo. The polymer obtained by this method was found to have a melt index of 15.8 g/10 min and an acid value of 2.3 mg KOH/g.

The peeling strength of an aluminum/aluminum bonded structure having an adhesive layer of the polymer obtained above in a thickness of 100μ was 14.1 Kg/25 mm.

Incidentally, in accordance with the above-mentioned process except using toluene as the solvent, the reaction was carried out in homogeneous system. As the result, the resulting polymer has a melt index of 8.5 g/10 min. and an acid value of 1.8 mg KOH. The peeling strength of an aluminum/aluminum bonded structure having an adhesive layer of the polymer in a thickness of 100μ was 5.0 Kg/25 mm.

As it is clear from the results, the resulting carboxylated ethylene-vinyl acetate copolymer had remarkably superior characteristics to that of the carboxylated ethylene-vinyl acetate copolymer obtained by a homogeneous system.

EXAMPLE 2

In the same manner as described in Example 1, carboxylation was conducted by using the following components.

| | |
|---|---|
| Ethylene-vinyl acetate copolymer (vinyl acetate content = 20%, melt index = 20 g/10 min, Vicat softening point = 57° C.) | 500 g |
| Fumaric acid | 10 g |
| Acetone | 1000 g |
| Benzoyl peroxide | 1 g |

The polymer obtained retained the form of the starting copolymer and was found to have a melt index of 17.3 g/10 min and an acid value of 0.9 mg/KOH/g.

The peeling strength of an aluminum/aluminum bonded structure having an adhesive layer of the polymer obtained above in a thickness of 100μ was 12.1 Kg/25 mm.

EXAMPLE 3

In the same manner as described in Example 1, the carboxylation reaction was conducted with the following components at 80° C.

| | |
|---|---|
| Ethylene-vinyl acetate copolymer (vinyl acetate content = 10%, melt index = 9 g/10, Vicat softening point = 75° C.) | 500 g |
| Fumaric acid | 12.5 g |
| Ethyl acetate | 800 g |

| | |
|---|---|
| Methyl ethyl ketone | 200 g |
| Benzoyl peroxide | 1.25 g |

The polymer obtained retained the original form of the charged copolymer and it was found to have a melt index of 5.0 g/10 min and an acid value of 1.6 mg KOH/g. The peeling strength of an aluminum-/aluminum bonded structure having an adhesive layer of the polymer obtained above in a thickness of 100μ was 6.8 Kg/25 mm.

The peeling strength of an aluminum/aluminum bonded structure having an adhesive layer of the starting ethylene vinylacetate copolymer in a thickness of 100μ was 1.8 Kg/25 mm.

EXAMPLE 4

A carboxylation reaction was conducted in the same manner as described in Example 1 with the following components except that the polymerization temperature was changed to 50° C.

| | |
|---|---|
| Ethylene-vinyl acetate copolymer (vinyl acetate content = 32%, melt index = 30 g/10 min, Vicat softening point = 35° C.) | 500 g |
| Fumaric acid | 12.5 g |
| Vinyl acetate | 25 g |
| Ethyl acetate | 150 g |
| Acetone | 850 g |
| t-Butyl per pivalate | 1.25 g |

The polymer obtained retained the original form of the charged copolymer and it was found to have a melt index of 25.5 g/10 min and an acid value of 3.6 mg KOH/g. The peeling strength of an aluminum-/aluminum bonded structure having an adhesive layer of the polymer obtained above in a thickness of 100μ was 19.9 Kg/25 mm. The starting ethylene-vinyl acetate copolymer used in this Example was found to have an aluminum/aluminum bonding strength of 5.5 Kg/25 mm.

Having now fully described the invention, it will be apparent to one of ordinary skill in the art that many changes and modifications can be made thereto without departing from the spirit or scope of the invention as set forth herein.

What is claimed is:

1. A process for the carboxylation of ethylene-vinyl acetate copolymers, which comprises:
copolymerizing an α, β-unsaturated carboxylic acid, an anhydride thereof or a mixture thereof with an ethylene-vinyl acetate copolymer in the presence of a polymerization initiator in a reaction medium of a ketone compound or a mixture of an acetic acid ester and a ketone compound, and optionally in the presence of at least one vinylidene monomer having the formula:

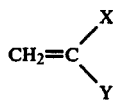

wherein X and Y can be the same or different and each represents hydrogen, chlorine, alkyl, acetoxy, carboxylic acid ester group or cyano;
wherein the reaction is conducted in a heterogeneous state so as not to alter the physical form of said ethylene-vinyl acetate copolymer.

2. The process of claim 1, wherein said vinylidene monomer is present during said copolymerization.

3. The process of claim 2, wherein the mixture of vinylidene monomer and α, β-unsaturated carboxylic acid, anhydride thereof or mixture thereof, comprises 99 to 10 parts by weight of said α, β-unsaturated carboxylic acid, anhydride thereof or mixture thereof, and 1 to 99 parts by weight of said vinylidene monomer.

4. A process according to claim 1, wherein the ethylene-vinyl acetate copolymer is used in an amount of 99 to 50 parts by weight and the α, β-unsaturated carboxylic acid, the anhydride thereof or mixture thereof, or a mixture of the carboxylic acid, the anhydride thereof or mixture thereof with said vinylidene monomer is used in an amount of 1 to 50 parts by weight.

5. A process according to claim 1 wherein the alpha, beta-unsaturated carboxylic acid anhydride thereof or mixture thereof is at least one member selected from the group consisting of acrylic acid, methacrylic acid, maleic acid, fumaric acid, itaconic acid, the methyl and ethyl hydrogen esters of maleic acid and fumaric acid, maleic anhydride and itaconic anhydride.

6. A process according to claim 1 wherein vinylidene monomer is at least one member selected from the group consisting of ethylene, propylene, isobutene, butene-1, octene-1, vinyl chloride, vinylidene chloride, vinyl acetate, vinyl chloroacetate, acrylonitrile and alkyl esters of acrylic acid and methacrylic acid.

7. A process according to claim 1 wherein the ethylene-vinyl acetate copolymer has a vinyl acetate content of 1 to 50% by weight and a melt index of 0.1 to 500 g/10 min.

8. A process according to claim 1 wherein the copolymerization reaction is conducted at a temperature in the range of room temperature to a temperature higher by up to 30° C., than the Vicat softening point of the ethylene-vinyl acetate copolymer.

9. A process according to claim 1 wherein the polymerization initiator is selected from the group consisting of dialkyl peroxides, diacyl peroxides, and peroxy esters.

10. A process according to claim 9, wherein the polymerization initiator is used in an amount of 1 to 50% by weight based on the alpha, beta-unsaturated carboxylic acid, anhydride thereof or mixture thereof or a mixture of the carboxylic acid the anhydride thereof or mixture thereof and the vinylidene monomer.

11. A process according to claim 1 wherein the reaction medium is a ketone compound of acetone, methyl ethyl ketone, methyl propyl ketone, methyl butyl ketone, diethyl ketone, ethyl propyl ketone, dipropyl ketone or a mixture of the ketone compound and acetic acid ester of methyl acetate, ethyl acetate, propyl acetate or butyl acetate.

12. A process according to claim 11 wherein a ratio of the ketone compound to the acetic acid ester is 100 to 5 parts by weight of the ketone compound to 0 to 95 parts by weight of the acetic acid ester.

* * * * *